United States Patent
Yang et al.

(10) Patent No.: US 11,092,533 B2
(45) Date of Patent: Aug. 17, 2021

(54) METHOD FOR MEASURING UNDISSOLVED MATERIAL IN POLYMER SOLUTION

(71) Applicant: LG CHEM, LTD., Seoul (KR)

(72) Inventors: Hwi Soo Yang, Daejeon (KR); Ga Hyun Lim, Daejeon (KR); Sang Hoon Choy, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/767,166

(22) PCT Filed: Jul. 31, 2019

(86) PCT No.: PCT/KR2019/009538
§ 371 (c)(1),
(2) Date: May 27, 2020

(87) PCT Pub. No.: WO2020/027573
PCT Pub. Date: Feb. 6, 2020

(65) Prior Publication Data
US 2020/0386663 A1 Dec. 10, 2020

(30) Foreign Application Priority Data

Aug. 3, 2018 (KR) .................... 10-2018-0090666

(51) Int. Cl.
*G01N 15/02* (2006.01)
*G01N 15/10* (2006.01)

(52) U.S. Cl.
CPC .  *G01N 15/0227* (2013.01); *G01N 2015/1087* (2013.01)

(58) Field of Classification Search
CPC ................... G01N 15/0227; G01N 2015/1087
(Continued)

(56) References Cited

U.S. PATENT DOCUMENTS 3,992,096 A * 11/1976 Oliveira ............... G01B 15/025
356/36
6,743,581 B1 * 6/2004 Vo-Dinh .......... G01N 33/54373
506/39
(Continued)

FOREIGN PATENT DOCUMENTS

CN 105600258 A 6/2016
EP 0119770 B2 1/1996
(Continued)

OTHER PUBLICATIONS

Sakurai et al., "Control of mesh pattern of surface corrugation via rate of solvent evaporation in solution casting of polymer film in the presence of convection," Polymer 43, 3359-3364 (2002).
(Continued)

*Primary Examiner* — Roy M Punnoose
(74) *Attorney, Agent, or Firm* — Morgan, Lewis & Bockius LLP

(57) ABSTRACT

The present invention relates to a method for measuring undissolved material in a polymer solution used in the production of electrode slurry using a surface light source. The method for measuring undissolved material in a polymer solution of the present invention comprises: a solution application step of applying a polymer solution on a transparent plate; a light supplying step of supplying light with a light source to the polymer solution applied on the transparent plate; a photographing step of photographing a shape of the light transmitted through the polymer solution applied on the transparent plate; and a measuring step of confirming the number and particle size of the undissolved material in the polymer solution with a photographed image.

13 Claims, 5 Drawing Sheets

(58) Field of Classification Search
USPC .......................................................... 356/335
See application file for complete search history.

(56) References Cited

U.S. PATENT DOCUMENTS

| | | | | |
|---|---|---|---|---|
| 7,425,310 | B2* | 9/2008 | Truex | G01N 25/482 |
| | | | | 422/68.1 |
| 9,181,085 | B2* | 11/2015 | Yoon | B82Y 40/00 |
| 2005/0277196 | A1 | 12/2005 | Lacombe et al. | |
| 2012/0114920 | A1* | 5/2012 | Yoon | B82Y 10/00 |
| | | | | 428/204 |
| 2019/0025282 | A1* | 1/2019 | Akiyama | G01N 33/574 |
| 2019/0128869 | A1* | 5/2019 | Chou | G01N 21/6428 |
| 2020/0048413 | A1* | 2/2020 | Asano | C08G 69/08 |

FOREIGN PATENT DOCUMENTS

| | | |
|---|---|---|
| EP | 3 304 038 A1 | 12/2016 |
| EP | 3 304 038 B1 | 12/2020 |
| JP | H08-151401 A | 6/1996 |
| JP | 2003-535316 A | 11/2003 |
| JP | 2013-531787 A | 8/2013 |
| JP | 2014-175166 A | 9/2014 |
| JP | 2015-025785 A | 2/2015 |
| JP | 2017-513012 A | 5/2017 |
| JP | 6368341 B | 7/2018 |
| KR | 10-0376084 B1 | 3/2003 |
| KR | 10-2013-0018523 A | 2/2013 |
| KR | 10-2017-0089232 A | 8/2017 |

OTHER PUBLICATIONS

Extended European Search Report dated Jan. 29, 2021 issued by the European Patent Office in corresponding European patent application No. 19845245.0.
Korean Office Action dated Mar. 2, 2021 issued by the Korean Patent Office in corresponding Korean patent application No. 10-2018-0090666.
International Search Report (with partial translation) and Written Opinion dated Oct. 23, 2019, issued in corresponding International Patent Application No. PCT/KR2019/009538.

* cited by examiner

[FIG. 1]
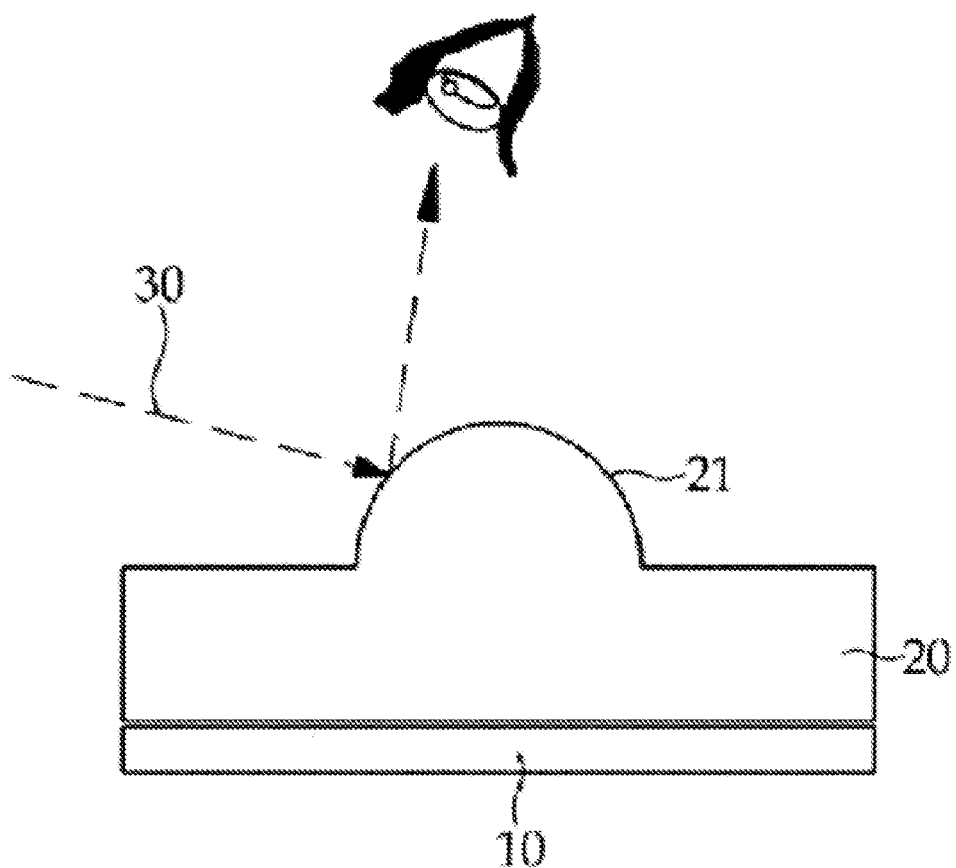
Prior Art

[Fig. 2]
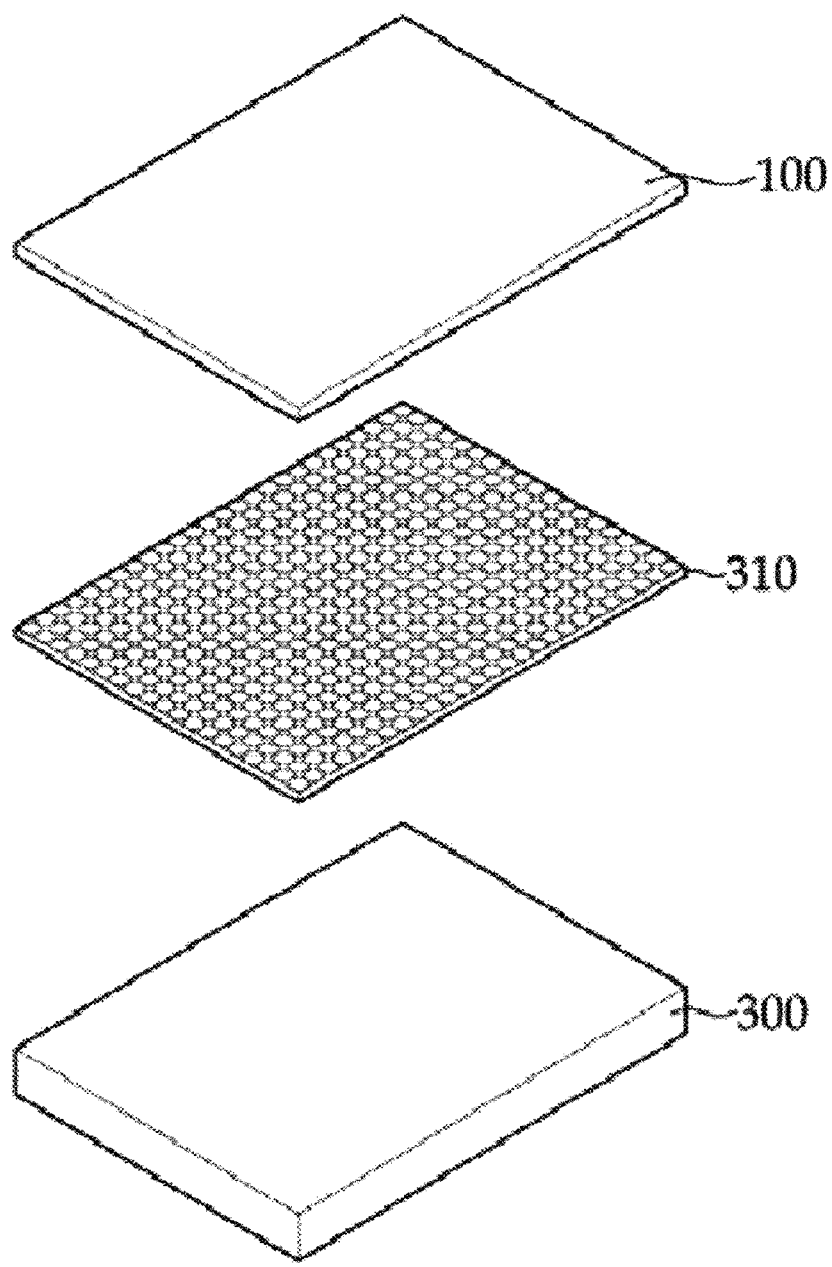

[Fig. 3]
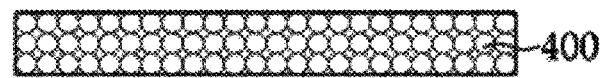
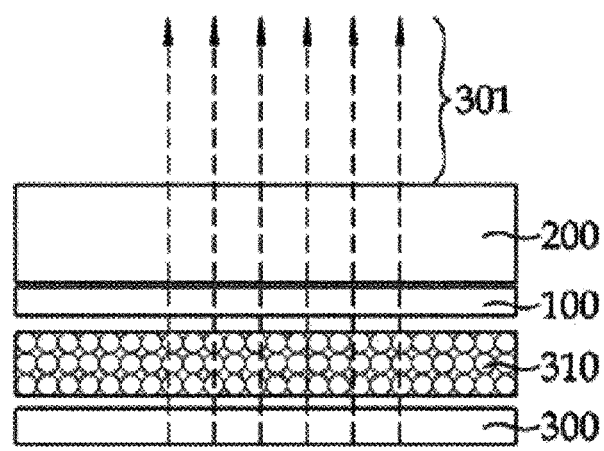
[Fig. 4]
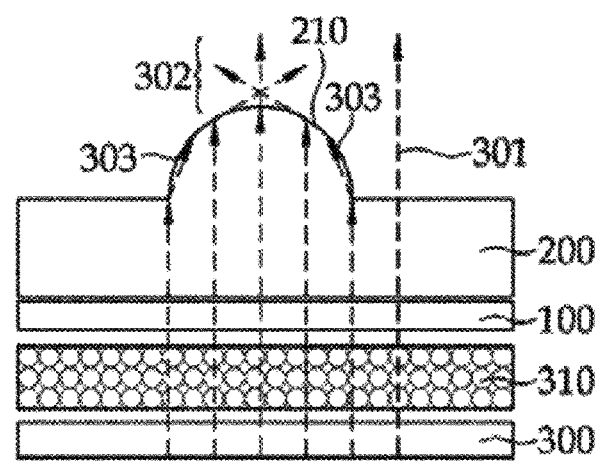

[Fig. 5]
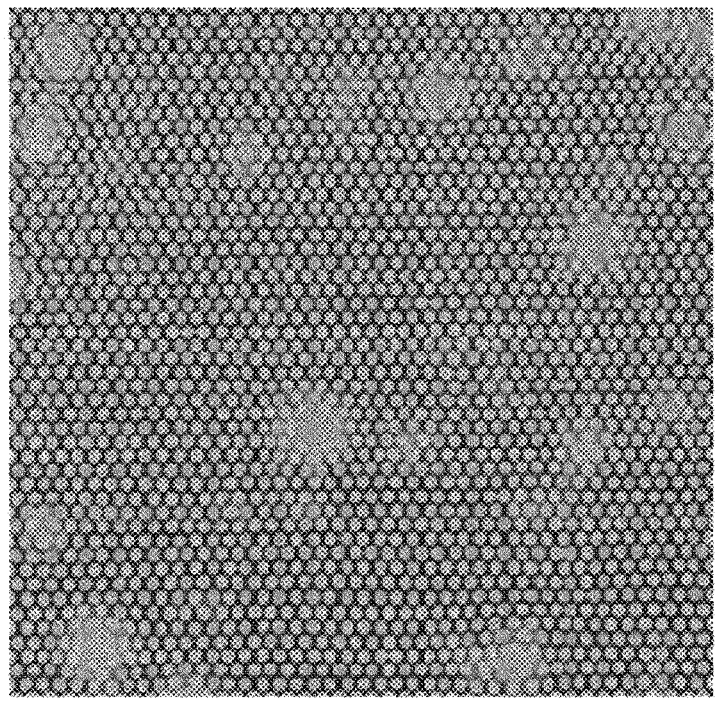
[Fig. 6]
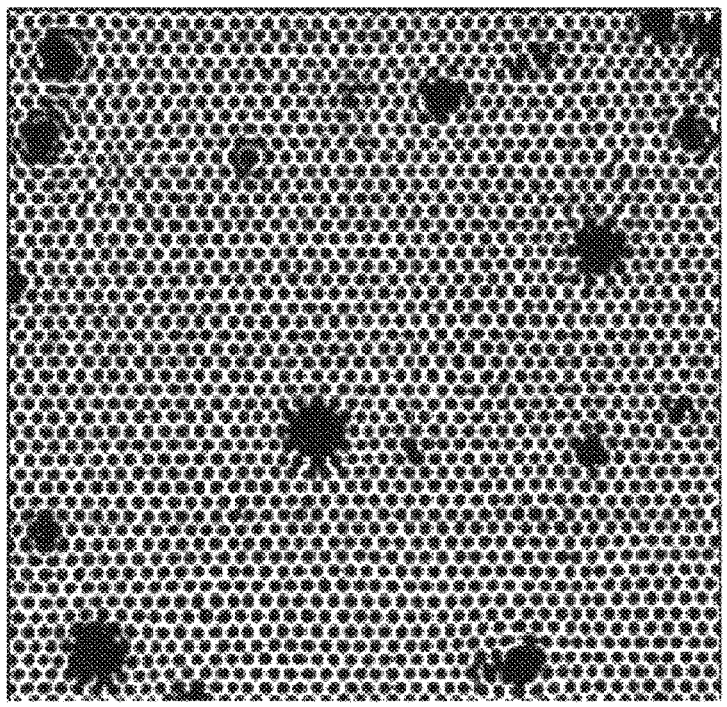

[Fig. 7]
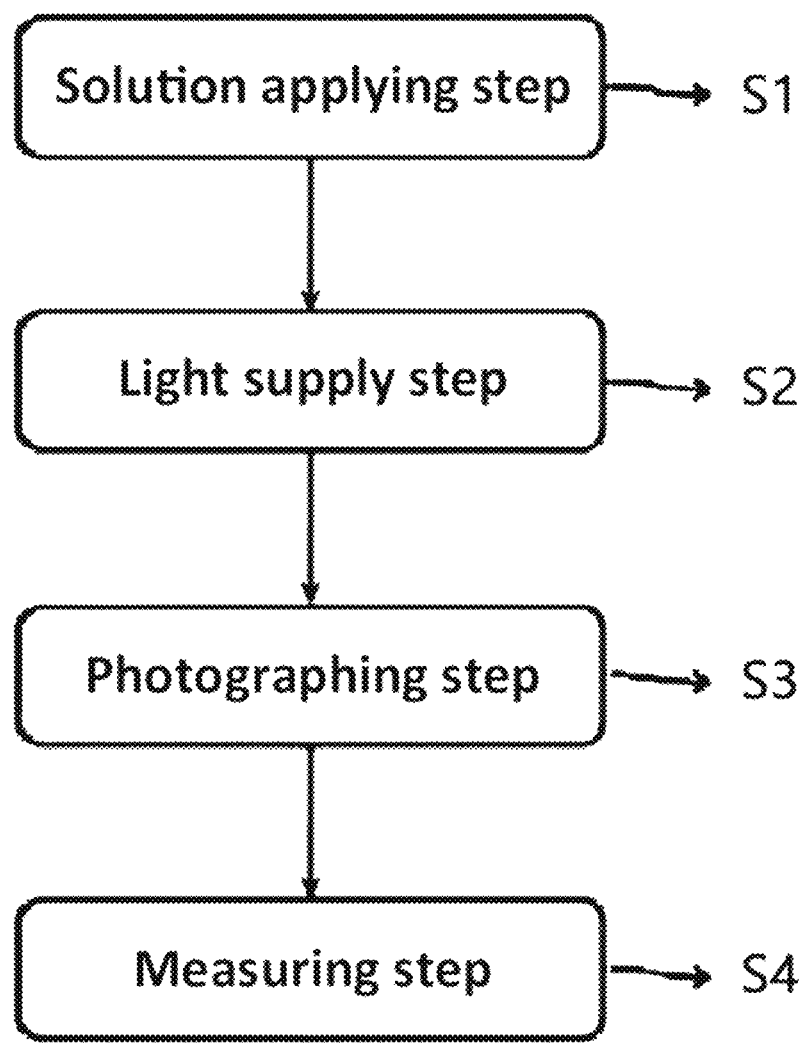

METHOD FOR MEASURING UNDISSOLVED MATERIAL IN POLYMER SOLUTION

TECHNICAL FIELD

This application claims the benefit of priority based on Korean Patent Application No. 10-2018-0090666, filed on Aug. 3, 2018, and the entire contents of the Korean patent application are incorporated herein by reference.

The present invention relates to a method for measuring undissolved substances of a polymer solution used in preparing an electrode slurry.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

The secondary battery is formed by inserting an electrode assembly including a positive electrode, a separator, and a negative electrode in a pouch and injecting electrolyte therein. The positive electrode and the negative electrode constituting the electrode assembly of the secondary battery are formed by applying a positive electrode active material and a negative electrode active material on an electrode sheet.

A lithium cobalt oxide, a lithium manganese oxide, a lithium nickel oxide, a lithium composite oxide, and the like are used as positive electrode active materials of the lithium secondary battery, and carbon materials are mainly used as negative electrode active materials and the use of silicon compounds and sulfur compounds as negative electrode active materials is also considered.

In order to prepare an electrode of such a secondary battery, a slurry is prepared by dispersing an active material, a conductive material, a binder, and the like in a solvent. Therefore, the slurry is directly applied to the electrode current collector and dried to thereby form an electrode of the secondary battery. Alternatively, the slurry is applied on the upper part of a separate support and dried, and then a film peeled from the support is laminated on the current collector to thereby form an electrode of a secondary battery.

In the case of the thickener or binder solution used to prepare an electrode slurry, since dissolution is performed not well, undissolved substances may be generated. Such undissolved substances may cause surface defects of electrodes and increased resistance of secondary batteries.

Currently, in the case of thickeners or binder solutions in the manufacture of electrode slurries, as shown in FIG. 1, a method of measuring undissolved substances is to apply a solution to a plate 10 with a blade and measure the number of gels 21 shown in the applied solution 20 in the light 30.

The measurement method is different in its standard according to the measuring person, and measurement errors may occur even when the measurement is performed by the same person. In addition, the measurement method has a disadvantage in that the size of the gel by the undissolved substances cannot be measured, and thus there is a limit in determining whether the performance of the battery by the undissolved substances is lowered when an actual electrode is manufactured.

Therefore, there is a need for a method that can more accurately determine the number of undissolved substances of a polymer solution used in the production of an electrode slurry.

DISCLOSURE

Technical Problem

It is an object of the present invention to solve the above-mentioned problems of the prior art and the technical problems required from the past.

Specifically, an object of the present invention is to provide a method for measuring undissolved substances of a polymer solution, and more particularly, to provide a method for effectively measuring the number and size of gels by the undissolved substances by scraping and applying the polymer solution using a blade having a fixed interval, supplying light from the bottom and, at the same time, photographing the shape of light having passed through the solution from the top.

Technical Solution

The method for measuring undissolved substances of a polymer solution for achieving the above object may include a solution application step of applying a polymer solution on a transparent plate; a light supplying step of supplying light to the polymer solution applied on the transparent plate by a light source; a photographing step of photographing a shape of the light having penetrated the polymer solution applied on the transparent plate; and a measuring step of checking a number and a particle size of undissolved substances in the polymer solution with the photographed image.

In the present invention, the polymer solution may be a polymer solution for preparing an electrode slurry of a secondary battery.

In the present invention, the minimum measurable particle diameter of the undissolved substances may be 100 µm.

In the present invention, the transparent plate may be made of OHP or glass.

In the solution application step of the present invention, the solution can be applied by scraping the polymer solution with a blade.

In the step of applying the solution of the present invention, the gap from the transparent plate to the blade may be 80 to 200 µm, more preferably 100 to 150 µm, most preferably 110 µm to 140 µm.

In the light supplying step of the present invention, the light source may be located under the transparent plate.

In the light supplying step of the present invention, the light source may be a planar surface light source.

The surface light source of the present invention may include the pattern for measuring the number and diameter of undissolved substances of the polymer solution on the upper part of the surface emitting light.

In the light supplying step of the present invention, the illuminance of the light source may be 750 to 1250 lux, more preferably 900 to 1100 lux.

In the photographing step of the present invention, the photographing may be performed at an upper portion of the transparent plate.

Advantageous Effects

The method of measuring undissolved substances of a polymer solution according to the present invention has an effect of objectively measuring the size and number of gels by the undissolved substances of the polymer solution when preparing an electrode slurry through an image photographed by a test device.

In addition, the method of measuring the undissolved substances of the polymer solution according to the present invention enables effective management of the undissolved substances in the prepared polymer solution for the slurry, thereby preventing the surface defect of the electrode and an increase in the resistance of the battery cell.

BRIEF DESCRIPTION OF THE DRAWINGS

FIG. 1 is a schematic diagram showing a conventional method for measuring the number of undissolved substances when preparing a slurry.

FIG. 2 is a perspective view showing the relative positions of a transparent plate, a pattern for measuring undissolved substances, and a light source in a method for measuring undissolved substances according to an embodiment of the present invention.

FIG. 3 is a side view showing a measurement when there is no undissolved substance in a polymer solution using a undissolved substance measurement method of a polymer solution according to an embodiment of the present invention.

FIG. 4 is a side view showing a measurement when there is are undissolved substances in a polymer solution using a undissolved substance measurement method of a polymer solution according to an embodiment of the present invention.

FIG. 5 shows an image of a polymer solution taken according to an embodiment of the present invention.

FIG. 6 shows an image converted by adjusting the brightness contrast of the image of FIG. 5 photographed according to an embodiment of the present invention.

FIG. 7 is a flowchart showing the procedure of a method for measuring undissolved substances of a polymer solution of the present invention.

DETAILED DESCRIPTION OF THE PREFERRED EMBODIMENTS

Hereinafter, embodiments of the present invention will be described with reference to the drawings. However, the present invention is not limited by the scope of the embodiments of present invention.

A method for measuring undissolved substances of a polymer solution according to the present invention will be described with reference to the flowchart of FIG. 7 and FIGS. 2 to 4.

As shown in FIG. 7, the method for measuring the undissolved substances of a polymer solution of the present invention may include: a solution application step of applying a polymer solution on a transparent plate 100 (S1); a light supplying step of supplying light to the polymer solution applied on the transparent plate 100 by a light source 300 (S2); a photographing step of photographing a shape of the light having penetrated the polymer solution 200 applied on the transparent plate 100 (S3); and a measuring step of checking a number and a particle size of undissolved substances in the polymer solution with the photographed image (S4).

First, in the solution applying step S1 of applying a polymer solution on the transparent plate 100, any transparent material through which light is transmitted may be used as the material of the transparent plate 100, but the material is preferably OHP or glass.

The polymer solution is evenly applied to the transparent plate 100. The transparent plate 100 should maintain a horizontal state with the ground in order to maintain the state of the applied polymer solution 200.

The polymer solution may be a polymer solution for an electrode slurry for manufacturing a positive electrode or a negative electrode. The polymer solution for the electrode slurry may be a thickener or binder solution used in preparing the electrode slurry.

The thickener may be one or more selected from the group consisting of Carboxymethyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC) and cellulose gum.

The binder may be one or more selected from the group consisting of styrene-butadiene rubber (SBR), polyvinylidene fluoride (PVdF), copolymer of polyhexafluoropropylene-polyvinylidene fluoride (PVdF/HFP), poly (vinylacetate), polyvinyl alcohol, polyethylene oxide, polyvinylpyrrolidone, alkylated polyethylene oxide, polyvinyl ether, poly (methyl methacrylate), poly (ethylacrylate), polytetrafluoroethylene (PTFE), polyvinylchloride, polyacrylonitrile, polyvinylpyridine, acrylonitrile-butadiene rubber and ethylene propylene diene monomer (EPDM).

In the present invention, the number and particle diameter of the undissolved substances that may cause surface defects of the electrode and increased resistance of the secondary battery are measured. The minimum measurable particle diameter of the undissolved substances may be 100 µm.

In the solution application step (S1), the solution can be applied by scraping the polymer solution with a blade. The application of the polymer solution should be made so that the light transmission is effective in the portion of the polymer solution where the undissolved substances do not exist, and the refraction of the light may be sufficiently observed in the portion of the polymer solution in which the undissolved substances exist.

In the step of applying the solution, the gap from the transparent plate 100 to the blade may be 80 to 200 µm, more preferably 100 to 150 µm, most preferably 110 µm to 140 µm. The gap from the transparent plate to the blade means the distance from the transparent plate to the blade edge.

When the distance from the transparent plate to the blade is less than 80 µm, a hole may occur depending on the viscosity, and when the size of the undissolved substance is large, there is a problem that it is difficult to observe the refraction of light by scratching the surface. In the case where the distance from the transparent plate to the blade exceeds 200 µm and the coating is too thick, the undissolved substances may not be sufficiently detected, and therefore it is preferable to adjust the distance from the transparent plate to the blade to 80 to 200 µm for relative comparison between test samples.

Next, in the light supply step S2 of supplying light to the polymer solution 200 applied on the transparent plate 100 by the light source 300, the light source 300 may be located below the transparent plate.

It is sufficient if the light source 300 can supply light evenly to the polymer solution 200 applied to the transparent plate 100, but the light source is preferably a planar surface light source which evenly supplies light to all areas of the applied polymer solution 200.

The planar surface light source of the present invention may include a pattern 310 for measuring the undissolved substances for measuring the number of undissolved substances of the polymer solution and the area on the upper part of the surface emitting light.

The pattern 310 for measuring the undissolved substances may be a pattern of a predetermined size printed on a transparent material that can transmit light, preferably a circular pattern for accurate measurement.

As illustrated in FIGS. 3 and 4, the light emitted from the light source 300 in the light supplying step (S2) of the present invention passes through the pattern 310 for measuring the undissolved substances, the transparent plate 100, and the applied polymer solution 200 in order.

In the light supply step of the present invention, the illuminance of the light source 300 is sufficient if it can sufficiently pass through the pattern 310 for measuring the undissolved substances, the transparent plate 100, and the applied polymer solution 200. Preferably, it may be 750 to 1250 lux, more preferably 900 to 1100 lux.

As shown in FIG. 3, when there is no undissolved substance in the applied polymer solution 200, the surface of the solution remains evenly flat. When the light emitted from the light source 300 passes through the portion having no undissolved substance, it passes through a path 301 without refraction. The light transmitted through the path 301 without refraction shows a shape 400 which projects the pattern 310 for measuring the undissolved substances as it is.

On the other hand, as shown in FIG. 4, when there are undissolved substances in the applied polymer solution 200, the undissolved substances generate a bend 210 by a gel on the surface of the solution.

When the light emitted from the light source 300 passes through the portion having no undissolved substance, it passes through a path 301 without refraction. Part of the light emitted from the light source is transmitted through a path (divergence, 302) refracted at the surface of the solution due to the bend 210 of the solution surface when there are undissolved substances in the applied polymer solution 200. Part of the light emitted from the light source is transmitted through a path (total reflection, 303) totally reflected at the surface of the solution due to the bend 210 of the solution surface when there are undissolved substances in the applied polymer solution 200.

The light transmitted through the path 301 without refraction shows a shape 400 which projects the pattern 310 for measuring the undissolved substances as it is. On the other hand, the light transmitted through the refracting path 302 ambiguously projects the pattern 310 for measuring undissolved substances. In addition, the light transmitted through the completely reflecting path 303 does not project the pattern 310 for measuring the undissolved substances.

Referring to FIGS. 5 and 6, a circular pattern is generally present in the background, and a blurred area covering the circular pattern is present in some places. As described above, the blurred area is an image which is generated as light irradiated from a light source is refracted by the bending of undissolved substances. In order for the undissolved substances to be easily distinguished, it is desirable that the size of the pattern formed on the image is smaller than the size of the blurred area. Therefore, it is preferable that the size of the pattern formed on an image is equal to or less than 100 micrometers which is a minimum diameter which can be measured. The size of the pattern formed on the image can be adjusted by appropriately selecting the distance between the light source and the transparent plate. In one embodiment of the present invention, in order to adjust the size of the pattern formed on the image to 80 μm or less, the distance between the light source and the transparent plate was adjusted to a length of 0.3 to 1 meters.

In the photographing step S3 of the present invention, the photographing may be performed at an upper portion of the transparent plate.

As shown in FIG. 3, when no undissolved substance exists in the applied polymer solution 200, all of the light emitted from the light source passes through the pattern 310 for measuring the undissolved substances, the transparent plate 100, the applied polymer solution 200 through the path 301 without refraction, to thereby project the pattern shape of the pattern 310 for measuring the undissolved substances as it is. In the photographing step, the shape of the projected light is photographed as an image. The image 400 when no undissolved substance exists in the applied polymer solution 200 is the same as the pattern shape of the pattern 310 for measuring the undissolved substance.

As shown in FIG. 4, when undissolved substances exist in the applied polymer solution 200, the light emitted from the light source penetrates the pattern 310 for measuring the undissolved substances, the transparent plate 100, and the applied polymer solution 200 through the path 301 without refraction, the refracting path 302, and the completely reflecting path 303.

The light transmitted through the refracting path 302 ambiguously projects the pattern 310 for measuring undissolved substances. In addition, the light transmitted through the completely reflecting path 303 does not project the pattern 310 for measuring the undissolved substances. In the photographing step, the shape of the projected light is photographed as an image. The image 410 when the undissolved substances exist in the applied polymer solution 200 is the same as the pattern shape of the pattern 310 for measuring the undissolved substances, but the portion where gels by the undissolved substances exist include a shape 411 which the boundary of the pattern is unclear.

In the measuring step (S4) of checking the number and particle size of the undissolved substances in the polymer solution with the photographed image of the present invention, the number and particle size of the undissolved substances in the polymer solution are checked by analyzing the image photographed in the photographing step (S3).

As shown in FIG. 4, in the measuring step (S4), the number and the area (pixel) of the shapes 411, of which the boundary of the pattern is unclear with the bend 210 by the undissolved substances in the applied polymer solution in the photographed image, are measured, and they can be converted into the particle diameters of the undissolved substances through the area.

The number of shapes 411 of which the boundary of the pattern is unclear means the number of undissolved substances in the polymer solution. The diameter of the shape 411 whose boundary of the pattern is unclear means the particle diameter of the undissolved substances in the polymer solution.

An image conversion step of adjusting the contrast of the image may be further included in order to facilitate analysis of the image photographed in the photographing step S3 before the measuring step S4 of the present invention. Through the image conversion step, the brightness of the unclear pattern 411 is lowered, so that the difference in brightness from the surrounding image becomes clearer, so that the number and particle size of the undissolved substances can be measured more accurately.

Hereinafter, the present invention will be described in detail with reference to Examples. However, the following Examples are only for illustrating the present invention, and the present invention is not limited by the following Examples.

Example 1

[Preparation of Transparent Plate and Light Source]

A circular pattern, in which circles are repeated, was positioned on the planar surface light source having an illuminance of 1000 lux. A transparent plate of glass material was placed on top of the planar surface light source where the circular pattern was located, and the transparent plate was positioned to be about 1 m away from the planar surface light source, so that the diameter of the circular pattern formed thereon was adjusted to be 80 μm.

[Solution Application Step]

The CMC solution (1.0 to 2.0% concentration solution dissolved in distilled water) was applied onto the transparent plate made of glass with a blade keeping a fixed distance of 100 μm from the transparent plate.

[Light Supply Step]

1000 lux of light was supplied through the planar surface light source from the bottom of the transparent plate coated with the CMC solution.

[Photographing Step]

The image of the light emitted from the light source and transmitted through the CMC solution in the light supply step was photographed using the camera located on the transparent plate, and the photographed image is shown in FIG. 5. The image was converted by adjusting the contrast in order to effectively measure the unclear portion of the photographed image. FIG. 6 shows an image converted from FIG. 5 by emphasizing contrast. As shown in FIGS. 5 and 6, the brightness of the unclear portion of the image generated by the gel by the undissolved substances in the solution was minimized through the image conversion.

[Measurement Step]

In the measuring step, a unique number is assigned to each of the parts in which the brightness of the converted image has been minimized, and pixel values of the image are measured for each unique number, and the results are shown in Table 1 below.

Example 2

When applying the CMC solution in Example 1, the number and the size of undissolved substances were checked in the same manner as in Example 1 except that the distance between the transparent plate and the blade was adjusted to 150 μm, and the result was shown in Table 1.

TABLE 1

| Example 1 | | Example 2 | |
| --- | --- | --- | --- |
| ID number | Pixel | ID number | Pixel |
| 1 | 6689 | 1 | 2195 |
| 2 | 4709 | 2 | 889 |
| 3 | 1292 | 3 | 5611 |
| 4 | 1318 | 4 | 7367 |
| 5 | 3832 | 5 | 604 |
| 6 | 1550 | 6 | 1266 |
| 7 | 5438 | 7 | 4302 |
| 8 | 2995 | 8 | 3804 |
| 9 | 685 | 9 | 502 |
| 10 | 1698 | 10 | 611 |

TABLE 1-continued

| Example 1 | | Example 2 | |
| --- | --- | --- | --- |
| ID number | Pixel | ID number | Pixel |
| 11 | 507 | 11 | 3032 |
| 12 | 570 | 12 | 758 |
| 13 | 7311 | 13 | 3938 |
| 14 | 928 | 14 | 2350 |
| 15 | 8437 | 15 | 1212 |
| 16 | 1403 | 16 | 2251 |
| 17 | 2426 | 17 | 1355 |
| 18 | 996 | 18 | 789 |
| 19 | 543 | 19 | 1980 |
| 20 | 2296 | 20 | 2750 |
| 21 | 7288 | | |
| 22 | 5051 | | |
| 23 | 1218 | | |

Comparative Example 1

The CMC solution used in the above example 1 was checked by naked eyes, and the number of gels by the undissolved substances shown in the applied solution was measured.

The measurements were carried out four times by three different testing persons each. The number of undissolved substances measured is shown in Table 2 below.

TABLE 2

| No. of measurement | Testing person 1 | Testing person 2 | Testing person 3 |
| --- | --- | --- | --- |
| 1 | 21 | 13 | 22 |
| 2 | 16 | 19 | 26 |
| 3 | 20 | 15 | 30 |
| 4 | 25 | 22 | 33 |
| Average | 20.5 | 17.25 | 27.75 |

As can be seen from the test results of Comparative Example 1, the measurement method by naked eyes showed different measurement values, depending on each round of measurement performed by one testing person for the same measurement target. In addition, since the criteria of undissolved substances are different for each testing person, different averages are shown at the measurement of the undissolved substances in the solution. In addition, visual inspection could not measure the size of the undissolved substances.

Comparative Example 2

When applying the CMC solution in Example 1, the solution was applied and light was supplied in the same manner as in Example 1 except that the distance between the transparent plate and the blade was adjusted to 250 μm. After that, it was tried to check the number and size of the undissolved substances, but because the CMC solution is too thick, the undissolved substances were completely covered by the CMC solution, and the number of the undissolved substances was shown as 6.

As described above, in the method of measuring the undissolved substances in the polymer solution according to an embodiment of the present invention, since the pattern formed in the image is clearly distinguished from the blurred area, there is an effect that there is no deviation in the number of the undissolved substances according to the testing person. In addition, since the actual particle size value of the undissolved substances can be calculated based on the pixel value of the blurred area, there is an effect that the particle size of the undissolved substances can be measured.

It will be understood by those skilled in the art that various changes in form and details may be made therein without departing from the spirit and scope of the invention as defined by the appended claims.

The invention claimed is:

1. A method for measuring undissolved substances in a polymer solution, the method comprising:
    applying a polymer solution on a transparent plate;
    supplying light to the polymer solution applied on the transparent plate by a light source;
    photographing a shape of the light having penetrated the polymer solution applied on the transparent plate and obtaining a photographed image; and
    checking a number and a size of particle of undissolved substances in the polymer solution from the photographed image.

2. The method of claim 1, wherein the polymer solution comprises a polymer solution for preparing a secondary battery electrode slurry.

3. The method of claim 1, wherein a minimum measurable particle size of the undissolved substances is 100 µm.

4. The method of claim 1, wherein the transparent plate comprises Over Head Projector (OHP) or glass.

5. The method of claim 1, wherein in the applying, the polymer solution is applied with a blade.

6. The method of claim 5, wherein a distance from the transparent plate to the blade is 80 to 200 µm.

7. The method of claim 5, wherein a distance from the transparent plate to the blade is 100 to 150 µm.

8. The method of claim 1, wherein the light source is positioned under the transparent plate in the light supplying step.

9. The method of claim 1, wherein the light source is a planar surface light source.

10. The method of claim 9, wherein the planar surface light source comprises a pattern for measuring the undissolved substances of the polymer solution on an upper part of the surface emitting light.

11. The method of claim 1, wherein an illuminance of the light source is 750 to 1250 lux.

12. The method of claim 1, wherein an illuminance of the light source is 900 to 1100 lux.

13. The method of claim 1, wherein the photographing is performed on an upper portion of the transparent plate.

* * * * *